Patented Sept. 26, 1939

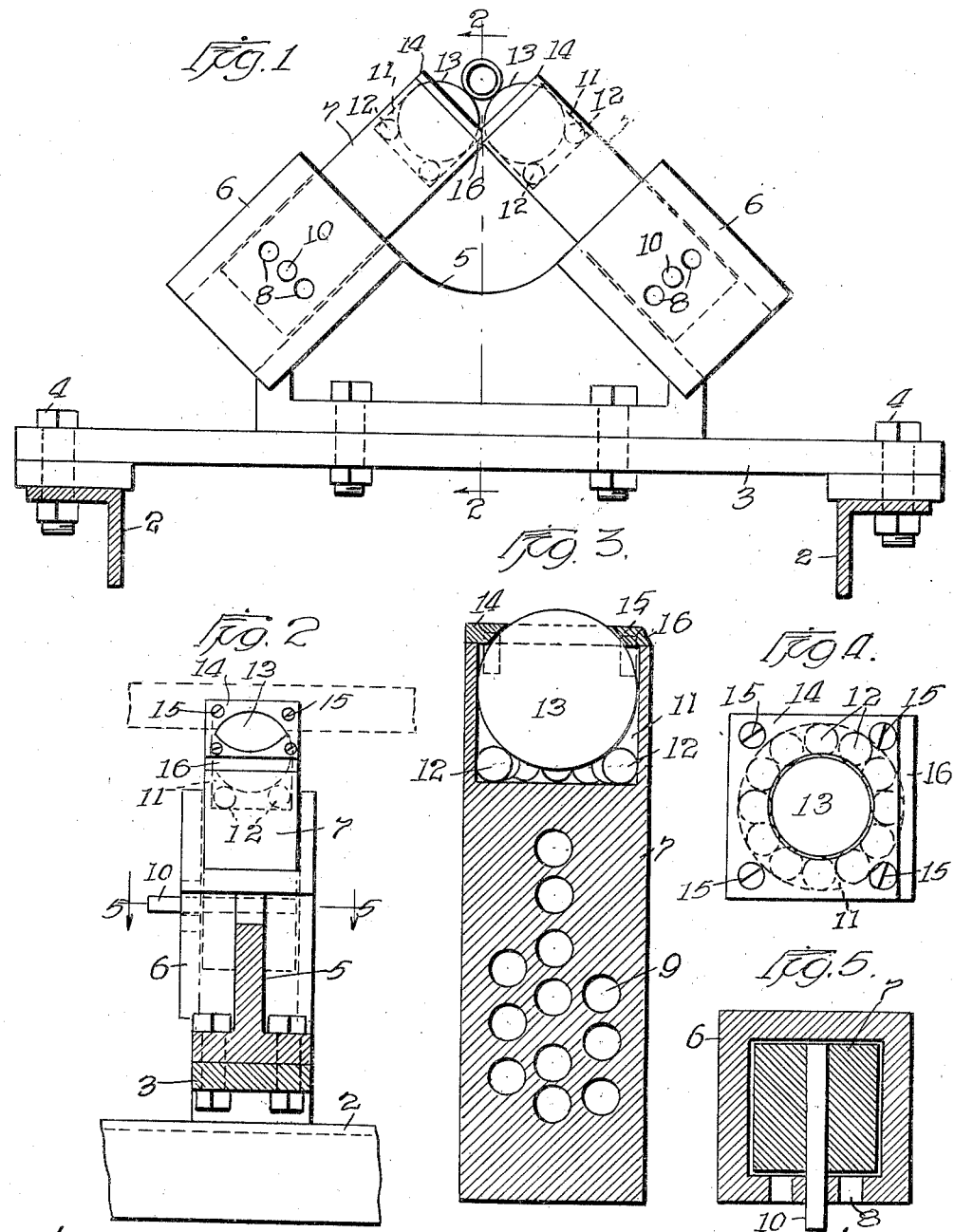

2,174,193

UNITED STATES PATENT OFFICE 2,174,193

ANTIFRICTION PIPE GUIDE

Alfred O. Mickelson, Chicago, and Alexander J. Duaei, Lombard, Ill.

Application September 25, 1937, Serial No. 165,646

6 Claims. (Cl. 193—38)

This invention relates to pipe supports and has for its principal object the provision of an antifriction support for pipes which are moving longitudinally into or out of a pipe coating and wrapping machine and at the same time are rotating about their axis.

A further object of the invention resides in the provision of a pipe guide that may be adjusted to accommodate various sizes of pipes.

Still another object in the invention resides in providing a pipe guide that is of simple construction and may be readily adjusted and is rugged and not likely to be broken or damaged in normal use.

Further objects of the invention not specifically mentioned here will be apparent from the detailed description and claims which follow, reference being had to the accompanying drawing in which a preferred embodiment of the invention is shown by way of example and in which:

Figure 1 is an end elevational view of the pipe guide;

Figure 2 is a cross-sectional view along the line 2—2 of Figure 1;

Figure 3 is a cross-sectional view along a median line through the support bar;

Figure 4 is an end view of the support; and

Figure 5 is a cross-sectional view along the line 5—5 of Figure 2 looking in the direction of the arrows.

In our prior Patent No. 2,048,557, issued July 21, 1936, there is shown a pipe coating and wrapping machine of the stationary type through which lengths of pipe are propelled to receive a coating of a rust preventing compound followed by one or more layers of a protective asbestos or paper. The machine rotates the pipe about its own axis and simultaneously advances it longitudinally thereof.

The present invention particularly relates to guides mounted upon the frame of a machine of this type to support the pipe lengths that are being fed into the machine, although the guides may be put to other uses.

Prior to feeding the pipe into a coating machine of this type, the pipe is treated with a priming coat which is a paint-like substance. This priming coat must not be damaged by the propelling mechanism of the coating and wrapping machine and therefore the pipe must be supported so as to be freely movable along its own axis and rotatable thereabout. In the larger sizes of pipe considerable weight is involved and highly anti-friction guides are required if the pipe is to be moved through the coating machine without damage to the priming coat.

Guides built in accordance with the teachings of our invention have been found to be satisfactory and capable of handling large and heavy pipes without damage to the priming coat.

Referring now to the drawing in more detail:

In Figure 1 we have shown in section angle members 2 which may be the side rails of a coating machine such as is shown in the abovementioned patent. Extending between these side rails is a supporting bar 3 which may be a strap or channel as desired. This supporting bar is secured to the side frame members of the machine by suitable bolts 4.

Centrally mounted upon the supporting bar is a base casting 5 which contains two sockets 6 that are inclined with respect to the base and supporting bar 3 in such a manner that the axes of the sockets intersect on a vertical line through the center of the casting. Ordinarily this vertical line will be located on the transverse center of the machine as shown in Figure 1 and in all instances it will coincide with the axis of the pipe that is being fed through the machine; as shown the casting is flanged to form mounting feet best seen in Figure 2, but this may be changed if desired.

Fitted within the sockets 6 are supporting bars 7 best seen in Figure 3. The sockets and bars may be of rectangular cross section as shown in Figure 5 or they may be round or polygonal, if desired. The sockets contain three openings 8 and the supporting bars contain three rows of holes 9 which are spaced so as to permit the holes 9 to be aligned with the holes 8 one at a time. A pin 10 is slipped into the registered opening and hole to fix the supporting bar with respect to the socket.

The inner ends of the supporting bars are counterbored as shown at 11, Figure 3, and a row of steel ballbearings 12 are placed in the bottom of the counterbore. A single hardened steel ball 13 is fitted in each counterbore and rests against ballbearings 12. The end of the support is fitted with a hardened plate 14 through which the ball 13 projects, the plate being shaped with a frusto-spherical chamfer which overhangs the ball 13 and serves to retain it in the counterbore. Plate 14 is secured to the bar 7 in any suitable manner, such as by screws 15.

As shown in Figure 1, the supports 7 are extended until the plates 14 of the two supports touch each other on the center line of the guide, the plates being chamfered as shown at 16, Figure 3, so that they may abut together solidly. In this position the guide is set to handle the smallest diameter pipes that the machine is capable of accommodating. For larger pipes the supports are backed down from the position in which they are shown in Figure 1 by first removing the pin 10 and bringing one of the other holes 9 into alignment with one of the openings 8 in the socket. By the use of the arrangement of holes shown in Figure 1, the guides may be adjusted to accommodate all sizes of pipe from ¾ inch up to 6 inches and by suitably proportioning the parts of the guide, other pipe sizes may be accommodated.

With the supporting arrangement for the ball 13 as shown, a suitable lubricant may be confined in the bottom of the counterbore and the ball 13 may be rotated freely in any direction. If a lubricant is used it must be one that will not interfere with the adherence of the coating to the pipe since a small quantity of lubricant may be carried to the pipe by ball 13. As the propelling mechanism of the machine advances and simultaneously rotates the pipe balls 13 rotate in a direction best suited to the movement of the pipe.

We have found that guides constructed as shown are possessed of many advantages. They are rugged and capable of withstanding the hard knocks encountered when a heavy pipe is placed upon them, they may be readily adjusted to accommodate various sizes of pipe, and there are no projecting parts which render it difficult to place a large pipe upon the guides.

While we have chosen to describe our invention by referring to a bracket mounted upon a pipe coating machine, and arranged to handle pipes, it will be apparent to one skilled in the art that the device may be put to other uses and therefore we are not to be limited by specific embodiment shown and described by way of example.

Having thus complied with the statutes and shown and described our invention, what we consider new and desire to be protected by Letters Patent is pointed out in the appended claims.

What is claimed is:

1. A pipe guide comprising, a base plate, rectangular sockets disposed on said plate at an angle thereto, the axes of said sockets intersecting above the center of the plate, rectangular bars disposed in said sockets, there being a plurality of perforations in said sockets and a plurality of perforations in said bars adapted to be registered one at a time to adjust the relative position of the bars with respect to the sockets, pin means adapted to fit in said registered perforations to maintain said adjustment, and anti-friction pipe engaging means retained in the ends of said bars.

2. A pipe guide comprising, a base plate, rectangular sockets disposed on said plate at an angle thereto, the axes of said sockets intersecting above the center of the plate, rectangular bars disposed in said sockets, there being a plurality of perforations in said sockets and a plurality of perforations in said bars adapted to be registered one at a time to adjust the relative position of the bars with respect to the sockets, pin means adapted to fit in said registered perforations to maintain said adjustment, a socket formed in the end of each of said bars, a pipe engaging ball disposed in said socket, anti-friction means within said socket engaging said ball, and means for retaining said ball and anti-friction means in said socket.

3. A pipe guide comprising, a base plate, rectangular sockets disposed on said plate at an angle thereto, the axes of said sockets intersecting above the center of the plate, rectangular bars disposed in said sockets and extending therefrom, means for holding said bars in said sockets, said means permitting adjustment of the bars along the axis of said sockets, and anti-friction means on the ends of said bars for engaging a pipe.

4. A guide for a pipe that is advanced into a coating machine and simultaneously rotated about its axis, comprising, a base, sockets disposed on said base at an angle with respect to the median line of the base and with their axes intersecting on said median line, bars mounted in said sockets for adjustment along said axes, bearing balls protruding from the ends of said bars, and means including ball bearings for supporting and retaining said bearing balls in said bars.

5. In a guide for supporting pipe that is being rotated and simultaneously moved longitudinally, a bracket, a pair of sockets on said bracket, support bars fitted in said sockets, and extending upward and inward therefrom, each of said bars containing a counterbore in its upper end, a row of ball bearings in the counterbore, a pipe engaging ball disposed in the counterbore and against said ball bearings, and a plate fixed on the end of the support through which said pipe engaging ball projects.

6. Guide means for pipe and the like comprising, a base, sockets on said base, bars mounted in said sockets for adjustment longitudinally, there being counterbores in the ends of said bars, a plurality of ball bearings in said counterbores, a bearing ball supported by said ball bearings and extending beyond the ends of said bars, and means on the ends of said bars for retaining said bearing balls in place.

ALFRED O. MICKELSON.
ALEXANDER J. DUAEI.